US011978987B2

(12) United States Patent
Grolle et al.

(10) Patent No.: US 11,978,987 B2
(45) Date of Patent: May 7, 2024

(54) ANTENNA PASS THROUGH MODULE

(71) Applicant: Lunar Energy, Inc., Mountain View, CA (US)

(72) Inventors: Steven Nicholas Grolle, Mountain View, CA (US); Peter H. J. How, Honolulu, HI (US); Charles Ingalz, San Jose, CA (US); Stephen Robert Bannick, San Francisco, CA (US); Andrew Diao, Santa Cruz, CA (US); Mark Daniel Goldman, Los Altos Hills, CA (US)

(73) Assignee: Lunar Energy, Inc., Mountain View, CA (US)

( * ) Notice: Subject to any disclaimer, the term of this patent is extended or adjusted under 35 U.S.C. 154(b) by 0 days.

(21) Appl. No.: 18/484,285

(22) Filed: Oct. 10, 2023

(65) Prior Publication Data

US 2024/0120694 A1 Apr. 11, 2024

Related U.S. Application Data

(60) Provisional application No. 63/415,121, filed on Oct. 11, 2022.

(51) Int. Cl.
*H01R 24/52* (2011.01)
*H04L 12/50* (2006.01)

(52) U.S. Cl.
CPC ........... *H01R 24/525* (2013.01); *H04L 12/50* (2013.01)

(58) Field of Classification Search
None
See application file for complete search history.

(56) References Cited

U.S. PATENT DOCUMENTS

| 10,498,061 B1 * | 12/2019 | Blasick | H01R 24/50 |
|---|---|---|---|
| 11,374,370 B2 * | 6/2022 | Paynter | H01R 24/564 |
| 2014/0120769 A1 * | 5/2014 | Dang | H01R 13/6586 |
| | | | 439/607.05 |
| 2023/0070651 A1 * | 3/2023 | Chornenky | H04B 1/18 |
| 2023/0155622 A1 * | 5/2023 | Raghavan | H03F 3/213 |
| | | | 370/277 |

* cited by examiner

*Primary Examiner* — Ross N Gushi
(74) *Attorney, Agent, or Firm* — Van Pelt, Yi & James LLP

(57) ABSTRACT

1. An inverter device is disclosed, including; an enclosure comprising a plurality of sides;
an antenna port in a first side of the plurality of sides; and an antenna pass through module comprising: an exterior connector assembly comprising a plurality of pins and a base, wherein the plurality of pins are operable to be connected to respective ones of a plurality of antennas, wherein the plurality of pins passes through the antenna port to an exterior of the enclosure, wherein the base of the exterior connector assembly is sealed against the first side on an interior of the enclosure to provide ingress protection; and an interior antenna circuit configured to: terminate connections from a plurality of transceivers within the interior of the enclosure; and select antenna signals from at least the plurality of pins on the exterior connector assembly to route the plurality of transceivers.

15 Claims, 8 Drawing Sheets

ANTENNA PASS THROUGH MODULE

CROSS REFERENCE TO OTHER APPLICATIONS

This application claims priority to U.S. Provisional Patent Application No. 63/415,121 entitled ANTENNA PASS THROUGH MODULE filed Oct. 11, 2022 which is incorporated herein by reference for all purposes.

BACKGROUND OF THE INVENTION

When an antenna module is located exterior to a device and a transceiver is located in the interior of the device, a cable is needed to connect the two components through the housing of the device. However, when there is a need to provide a certain level of water resistance for the interior of the device, the cable presents a hurdle because it is a challenge to get a coaxial cable through a water-tight connection.

BRIEF DESCRIPTION OF THE DRAWINGS

Various embodiments of the invention are disclosed in the following detailed description and the accompanying drawings.

DETAILED DESCRIPTION

Figure 1:
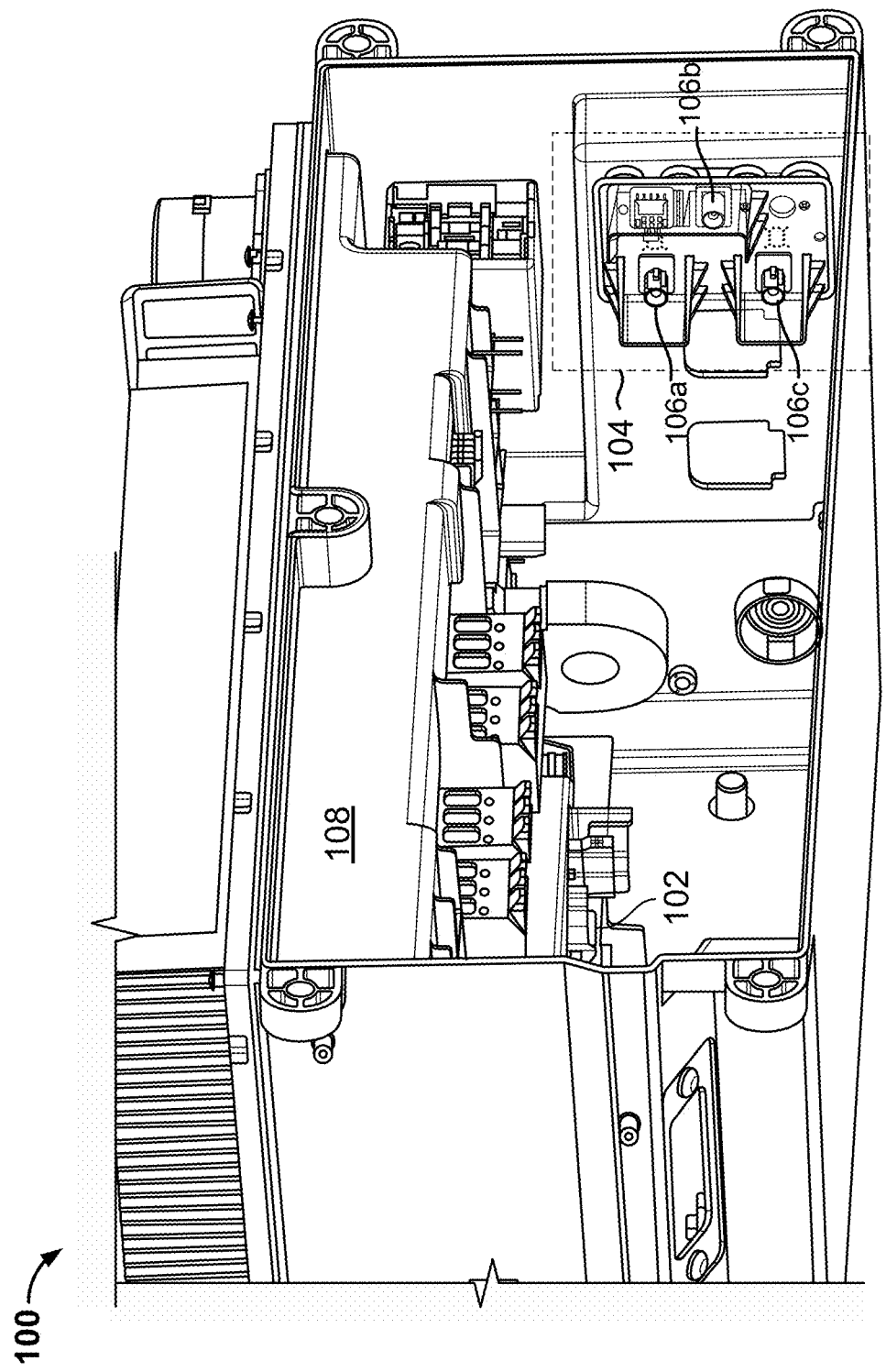
FIG. 1 is a diagram that shows an example of an inverter device with an antenna pass through module in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of an antenna pass through module are described herein. In various embodiments, the antenna pass through module is installed in a device. For example, the device is an inverter device. The device comprises an enclosure with a plurality of sides. A first side of the plurality of sides includes an antenna port (e.g., an opening). The antenna pass through module comprises an exterior connector assembly. The exterior connector assembly has a plurality of pins that are operable to be connected to respective ones of a plurality of antennas, which are also located on the exterior of the device. The plurality of pins of the exterior connector assembly passes through the antenna port to the exterior of the enclosure. A base of the exterior connector is sealed against the first side on the interior of the device's enclosure to provide ingress protection. The antenna pass through module further comprises an interior antenna circuit that terminates connections from a plurality of transceivers within the interior of the enclosure and selects antenna signals from at least the plurality of pins on the exterior connector assembly to route to the plurality of transceivers.

FIG. 1 is a diagram that shows an example of an inverter device with an antenna pass through module in accordance with some embodiments. Inverter device 100 is configured to convert input direct current (DC) into output alternating current (AC). In FIG. 1, inverter device 100 is shown with one of its sides removed to provide a view of the inside of the device. As shown in FIG. 1, the antenna pass through module in inverter device 100 includes a portion on the interior of inverter device 100 and also a portion on the exterior of inverter device 100. FIG. 1 shows interior antenna interface panel 104, which is the portion of an antenna pass through module that is located on the interior of inverter device 100. The portion (which is sometimes referred to as the one or more "exterior connector assemblies"), which will be described in further detail in FIG. 5, of the antenna pass through module that is primarily located on the exterior of inverter device 100 passes through from the interior to the exterior of inverter device 100 through one or more openings through a side of inverter device 100.

Antenna interface panel 104 includes one or more antenna diversity circuits that are secured against the interior side of inverter device 100 to which antenna interface panel 104 is mounted. In various embodiments, each antenna diversity circuit of interior antenna interface panel 104 is configured to receive two or more antenna incoming signals of the same signal type via the one or more exterior connector assemblies on the exterior of inverter device 100, select one (e.g., with the strongest signal), and then route the corresponding transceiver, which is located in the interior of inverter device 100, to that selected antenna signal input. As will be shown in FIG. 5 below, the one or more exterior connector assemblies form the portion of the antenna pass through module that is located on the exterior of inverter device 100 and each exterior connector assembly can be connected to a respective antenna module (not shown) that is also located on the exterior of inverter device 100. In various embodiments, where there is more than one antenna module, different antenna modules would receive redundant signals relative to each other, and also, each antenna module is located at a different position on the exterior of inverter device 100. Given that the location of an antenna module determines, in part, the interference that will be experienced by the antenna module, placing more than one antenna module on the exterior of inverter device 100 would provide an antenna diversity circuit (located within antenna interface panel 104) an opportunity to select the strongest signal that is received across the multiple antenna modules. The antenna module(s) include antennas that receive several different types of signals that span a wide range of frequencies. For example, the antennas in the antenna module(s) can receive LTE signals, Bluetooth signals, Wi-Fi signals, cellular data signals, and/or 900 megahertz data signals.

In various embodiments, each antenna diversity circuit of antenna interface panel 104 is also configured to receive an signal input from a respective transceiver in the interior of inverter device 100, and reproduce that signal to each pin corresponding to that signal type in each of the one or more exterior connector assemblies of the antenna pass through module.

Antenna interface panel 104 of the antenna pass through module includes an insulating (e.g., plastic) overmolded cover over the antenna diversity circuit(s). The overmolded cover of antenna interface panel 104 provides a watertight seal over the four edges and substantially over the top and bottom surfaces of the circuit board on which the antenna diversity circuits are configured. The overmolded cover of antenna interface panel 104 includes cutout areas in the top and bottom surface areas of the circuit board through which certain components that are coupled to the antenna diversity circuits, such as, interior connectors (106a, 106b, and 106c) and one or more exterior connector assemblies can be exposed to interface with cabling. As shown in the example of FIG. 1, antenna interface panel 104 includes three interior connectors (106a, 106b, and 106c) that can be connected via coaxial cables to a communications interface that is located on home controller 102, which includes functionalities such as communicating with the vertical stack as well as users. In some embodiments, the transceiver(s) that are routed to the antenna input signal(s) that are selected by the antenna diversity circuit(s) of antenna interface panel 104 are also located in home controller 102 on the interior of inverter device 100. In some embodiments, each interior connector (106a, 106b, or 106c) of antenna interface panel 104 is connected via a coaxial cable to a respective transceiver. As shown in FIG. 1, home controller 102 is located next to inverter module 108, which is configured to perform the primary function of inverter device 100, which is to convert DC to AC.

Antenna interface panel 104 of the antenna pass through module provides a watertight or at least strongly water-resistant seal around the openings/ports of the interior side of inverter device 100 through which the one or more exterior connector assemblies of the antenna pass through module are inserted. The design of antenna interface panel 104 can provide an ingress protection (IP) rating of approximately IP 56, which is strong enough to protect against dust and also powerful water jets, for example, for the antenna diversity circuit components within antenna interface panel 104 along with the other components that are exposed to the internal environment within inverter device 100. By allowing coaxial connections between home controller 102 and antenna interface panel 104 (which includes water resistant connections to exterior connector assemblies on the exterior of inverter 100) to exist only within the internal environment of inverter device 100, the need to directly link home controller 102 on the interior of inverter device 100 to antenna modules on the exterior of inverter device 100 with coaxial cables that are inserted through openings of the device is obviated and so is the challenge/expense of sealing such openings while still providing a water resistant (e.g., IP 56) environment within the device.

Figure 2:
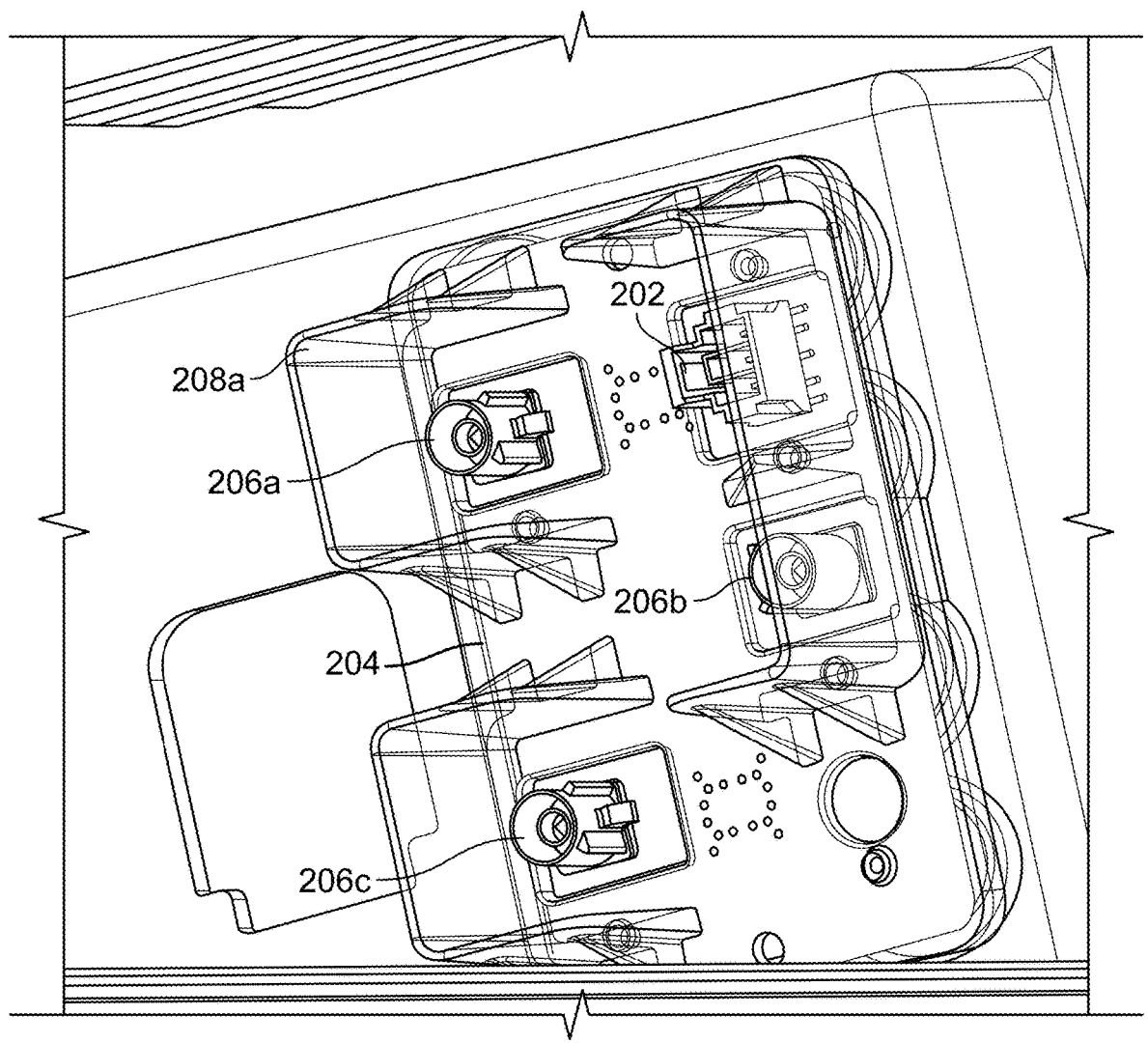
FIG. 2 is a close-up view of an example of the antenna interface panel portion of an antenna pass through module that has been installed in an inverter device in accordance with some embodiments.

FIG. 2 is a close-up view of an example of the antenna interface panel portion of an antenna pass through module that has been installed in an inverter device in accordance with some embodiments. In some embodiments, antenna interface panel 104 of FIG. 1 may be implemented using the example shown in FIG. 2. The example antenna interface panel of FIG. 2 is on the interior of the inverter device and includes a circuit board that is substantially covered by insulating (e.g., plastic) overmolded cover 204. Overmolded cover 204 does provide cutout regions over the circuit board that expose power connector 202, interior connectors 206a, 206b, and 206c to the internal environment of the inverter device. For example, power connector 202 is a low-voltage connector which receives a cable that provides power to the antenna diversity circuit(s) of the antenna pass through module. In some embodiments, other electrical components on the circuit board that are completely covered by overmolded cover 204 include the one or more antenna diversity circuits. As a result of the coverage by overmolded cover 204, in some embodiments, the antenna diversity circuit(s) are given greater IP protection than the internal environment of the inverter device. As mentioned above, each antenna diversity circuit is configured to receive multiple incoming antenna signals of the same type that have been received from exterior connector assemblies of the antenna pass through module and where the exterior connector assemblies are located on the exterior of the inverter device. The antenna diversity circuit is then configured to apply a set of selection criteria to the received signals and select the strongest signal to route to a corresponding transceiver through a corresponding interior connector (one of interior connectors 206a, 206b, and 206c) and a corresponding coaxial cable. Each transceiver is located in the interior of the inverter device (e.g., within a home controller module, which is not shown in FIG. 2). In some embodiments, each antenna diversity circuit is further configured to receive an outgoing signal from a corresponding transceiver on the interior of the inverter device and then expand/reproduce that signal to an antenna (e.g., radio frequency (RF)) pin on each exterior connector assembly that is connected to a corresponding antenna module. The outgoing signal will then be transmitted by each antenna module that is coupled to a pin that received the signal.

In some embodiments, each of interior connectors 206a, 206b, and 206c is implemented using an automotive connector. For example, each of interior connectors 206a, 206b, and 206c is a FAKRA connector.

In some embodiments, each of interior connectors 206a, 206b, and 206c is keyed to a corresponding coaxial cable such that only the correct coaxial cable (the coaxial cable with the complementary pins) can engage each interior connector to route outgoing signals to that interior connector from a transceiver and route incoming signals from that interior connector to the transceiver. For example, each of interior connectors 206a, 206b, and 206c has a different pattern of protrusions around it and only a coaxial cable with a pin of a complementary pattern of recesses can plug into that connector.

In some embodiments and as shown in FIG. 2, each of interior connectors 206a, 206b, and 206c is at least partially surrounded by a respective raised housing that is part of overmolded cover 204. The respective housing that partially surrounds each of interior connectors 206a, 206b, and 206c (e.g., housing 208a of overmolded cover 204 partially surrounds interior connector 206a) protects the connection between each interior connector and its respectively keyed coaxial cable.

While the example of FIG. 2 shows that the antenna interface panel includes three interior connectors, in other examples, the antenna interface panel may include fewer or more than three interior connectors.

Figure 3:
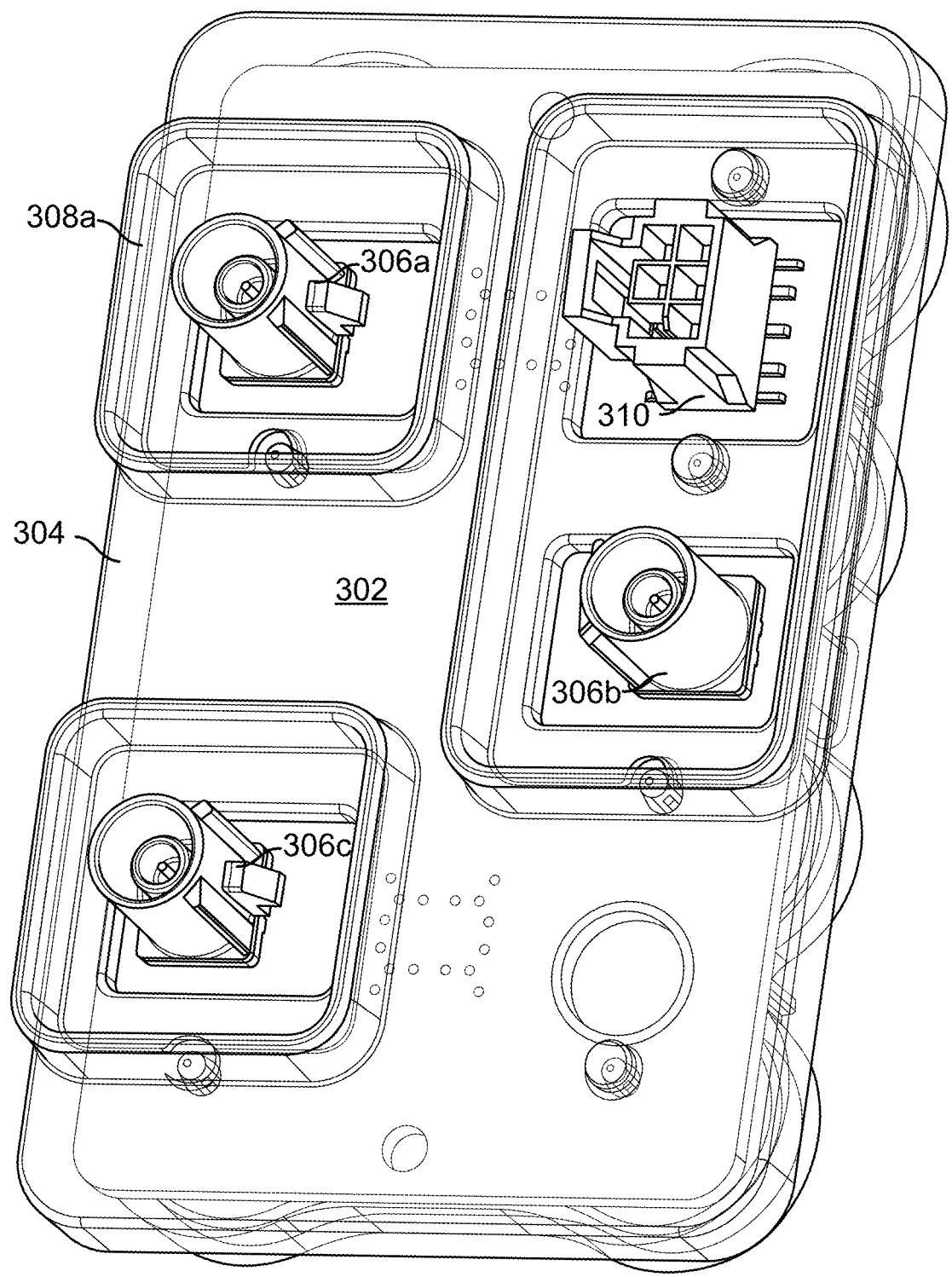
FIG. 3 is a close-up view of another example of the antenna interface panel portion of an antenna pass through module that is not currently installed in an inverter box in accordance with some embodiments.

FIG. 3 is a close-up view of another example of the antenna interface panel portion of an antenna pass through module that is not currently installed in an inverter box in accordance with some embodiments. In the example of FIG. 3, insulating (e.g., plastic) overmolded cover 304 is shown as a translucent cover over the four edges, and substantially over the areas of the top and bottom surfaces of circuit board 302. Similar to the example of FIG. 2, in the example of FIG. 3, overmolded cover 304 includes four cutout regions over the surface of circuit board 302 that respectively includes interior connectors 306a, 306b, and 306c and power connector 310 to expose those connectors. Unlike the example of FIG. 2, in the example of FIG. 3, interior connectors 306a, 306b, and 306c and power connector 310 are completely surrounded by a respective housing that is part of overmolded cover 304. The respective housing that completely surrounds each of interior connectors 306a, 306b, and 306c and power connector 310 (e.g., housing 308a of overmolded cover 304 completely surrounds interior connector 306a) protects the connection between each interior connector and its respectively keyed coaxial cable.

Figure 4:
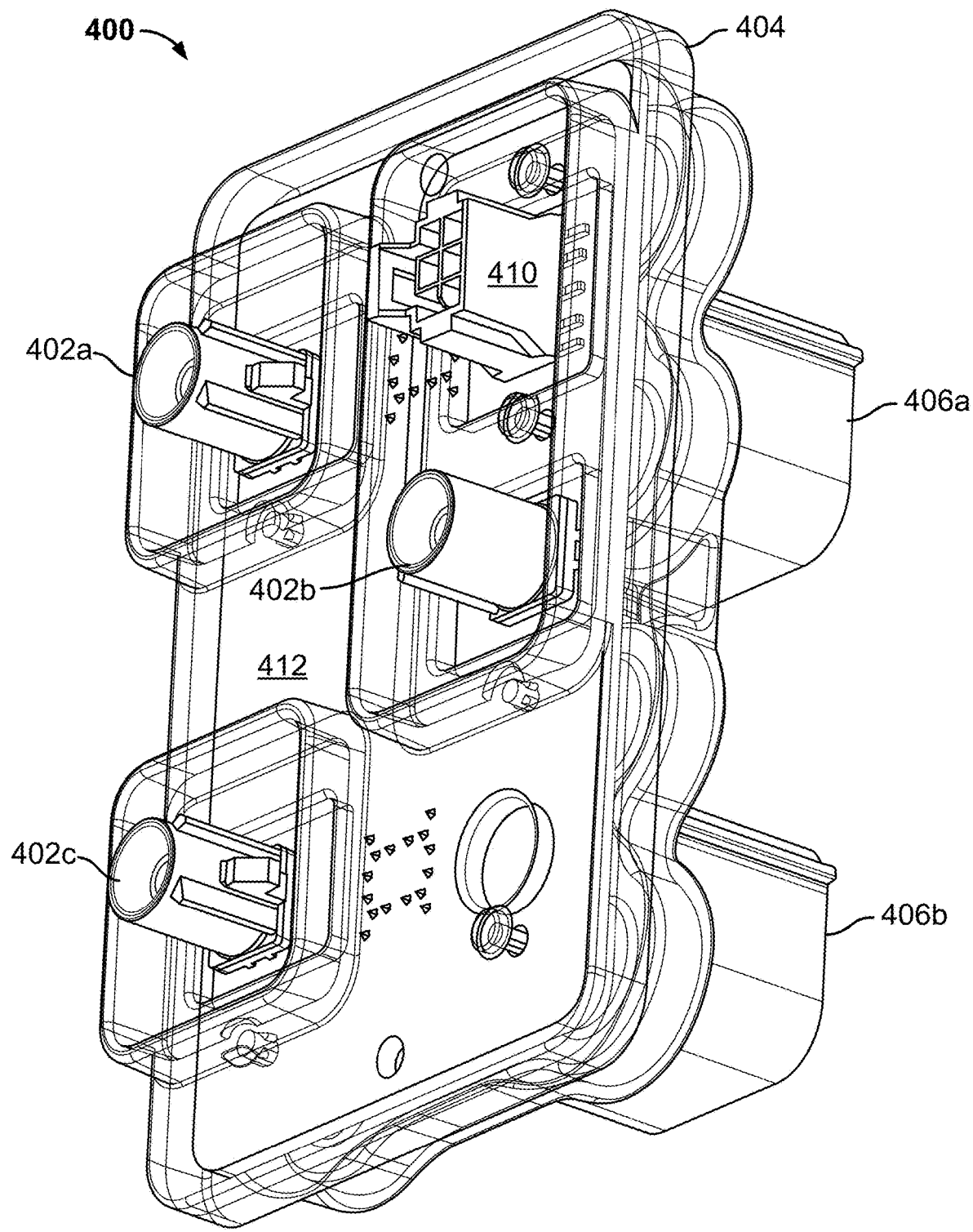
FIG. 4 is a close-up view of an example of the antenna interface panel portion and the exterior connector assemblies of an antenna pass through module that is not currently installed in an inverter device in accordance with some embodiments.

FIG. 4 is a close-up view of an example of the antenna interface panel portion and the exterior connector assemblies of an antenna pass through module that is not currently installed in an inverter device in accordance with some embodiments. In the example of FIG. 4, both the connectors of antenna pass through module 400 that would be included on the interior of the inverter device (interior connectors 402a, 402b, and 402c and power connector 410) and the connectors of antenna pass through module 400 that would be exposed to the exterior of the inverter device (exterior connector assemblies 406a and 406b) are visible. As shown in FIG. 4, the connectors of antenna pass through module 400 that are located on the inside/interior of the inverter device and the connectors of antenna pass through module 400 that are exposed to the exterior of the inverter device are located on opposite surfaces of antenna pass through module 400. As will be described in greater detail below in FIG. 5, exterior connector assemblies 406a and 406b of antenna pass through module 400 each includes a respective base that is to connect to circuit board 412. The respective base of each of exterior connector assemblies 406a and 406b are surrounded by insulating overmolded cover 404 so as to provide a protective seal around the connections between exterior connector assemblies 406a and 406b and circuit board 412. During the installation of antenna pass through module 400 into an inverter device, the antenna pins of each exterior connector assemblies 406a and 406b are inserted, from the interior of the inverter device, through a respective, complementary port/opening in a side of the inverter device such that exterior connector assemblies 406a and 406b and the pins of exterior connector assemblies 406a and 406b emerge on the opposite, exterior side of that wall.

Figure 5:
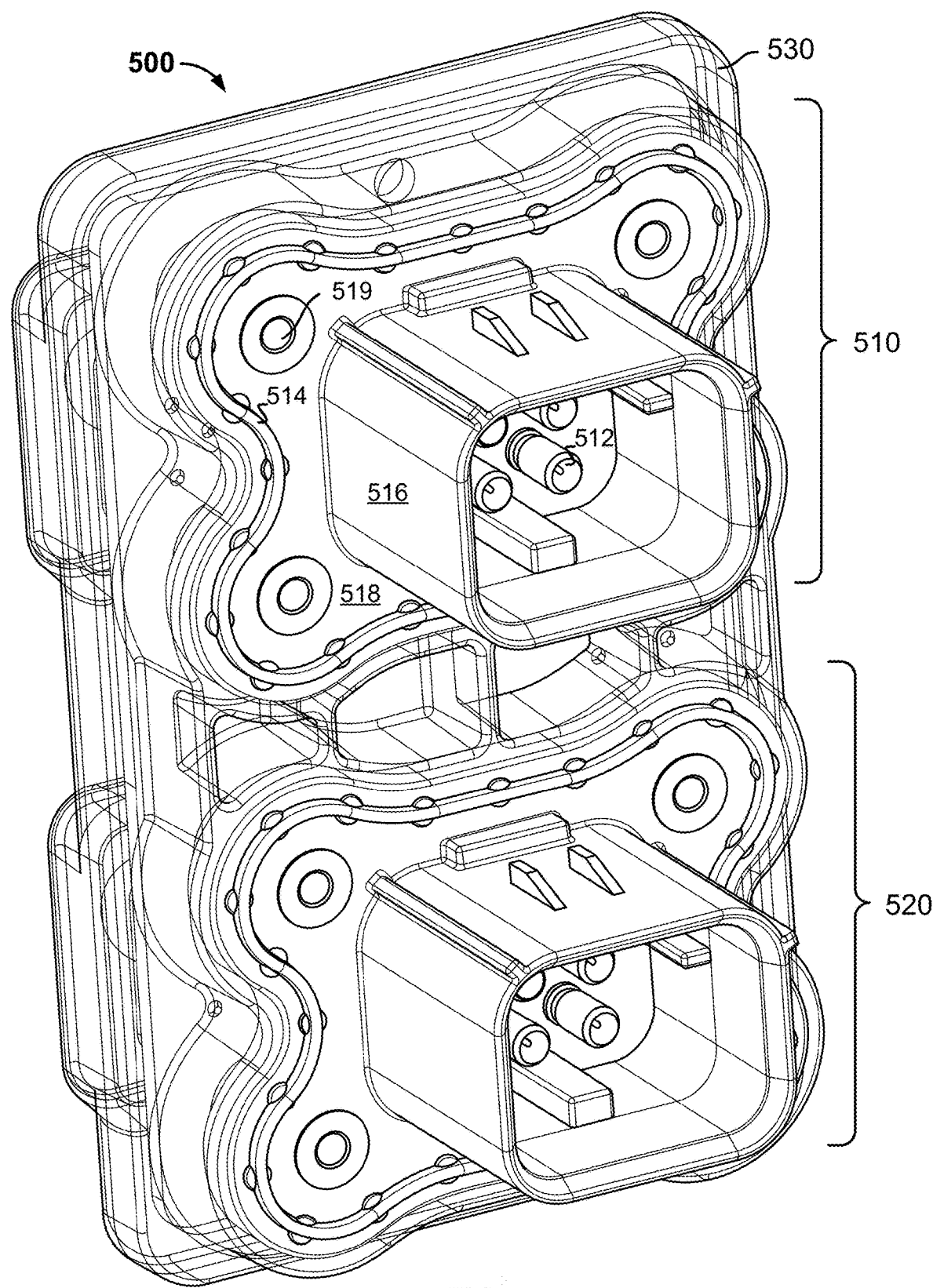
FIG. 5 is a close-up view of an example of the exterior connector assemblies of an antenna pass through module that is not currently installed in an inverter device in accordance with some embodiments.

FIG. 5 is a close-up view of an example of the exterior connector assemblies of an antenna pass through module that is not currently installed in an inverter device in accordance with some embodiments. In the example of FIG. 5, antenna pass through module 500 includes two exterior connector assemblies, 510 and 520. Because each of exterior connector assemblies 510 and 520 have the same subcomponents and is installed similarly into an inverter device, only exterior connector assembly 510 will be described in detail. As shown in FIG. 5, exterior connector assembly 510 includes four antenna pins (e.g., pin 512) that go through base 518 and are connected to the circuit board below. The four pins of exterior connector assembly 510 are surrounded by a raised housing, housing 516. During the installation of antenna pass through module 500 into an inverter device, the housing of each exterior connector assembly (e.g., housing 516) is inserted through a complementary port/opening through an interior side of the inverter device. After the insertion of the housing of each exterior connector assembly through a complementary port/opening through an interior side of the inverter device, the housing and the pins that it surrounds of the exterior connector assembly are located on the exterior of the inverter device. In various embodiments, gasket 514 (which is made of flexible, compressible material such as elastomer) that encircles base 518 of exterior connector assembly 510 rises above the height of overmolded cover 530 and so after the installation of exterior connector assembly 510 into the inverter device, gasket 514 is pressed up against the interior side (bulkhead) of the inverter device around the port and provides a watertight form of ingress protection for the interior of the device. In some embodiments, despite gasket 514 primarily providing a seal of base 518 of exterior connector assembly 510 against the interior side (bulkhead) of the inverter device around the port, because overmolded cover 530 is also made from flexible, compressible material, overmolded cover 530 provides additional sealing/ingress protection around the port. Through-holes (e.g., 519) on exterior connector assembly 510 match up to corresponding holes through the side of the inverter device and receive respective fasteners (e.g., screws) to hold antenna pass through module 500 (and gaskets such as gasket 514) in place against the interior side of the inverter device.

In various embodiments, multiple instances of an antenna module for sending and receiving signals are mounted at different locations on the exterior of the inverter device. Each antenna module includes antennas for sending and receiving different types of signals (e.g., LTE, WiFi, Bluetooth, and/or 900 Mhz). As mentioned above, while the different instances of the antenna module receive redundant types of signals, the signals that are received at the different instances may vary in strength due to the interference/location associated with each antenna module. As such, each instance of an antenna module would be connected to a different subset of the pins across exterior connector assemblies 510 and 520 of antenna pass through module 500. Put another way, there are at least two pins across the exterior connector assemblies that would be receiving the same type of signals but from different instances of antenna modules. In the example of FIG. 5, a respective coaxial cable would connect the respective pins of each of exterior connector assemblies 510 and 520 to a different antenna module such that one pin of exterior connector assembly 510 and another pin of exterior connector assembly 520 would both receive the same type of incoming signals but from different antenna modules (e.g., that are located in different physical locations on the exterior of the inverter device).

The incoming signals of the same signal type (e.g., LTE, WiFi, Bluetooth, or 900 Mhz) that would be received at multiple pins across exterior connector assemblies 510 and 520 are then passed to an antenna diversity circuit corresponding to that signal type of antenna pass through module 500 on the interior of the inverter device. The antenna diversity circuit would then be configured to apply selection criteria to the received incoming signals to select the strongest signal of that signal type and route it to an interior connector (e.g., one of interior connectors 402a, 402b, and 402c of FIG. 4) of antenna pass through module 500. The selected incoming signal would then be routed, via a coaxial cable, to a corresponding transceiver on the inverter device for decoding and processing.

The outgoing signal from a certain transceiver on the interior of the inverter device would be routed, via a coaxial cable, to a corresponding interior connector of antenna pass through module 500. The outgoing signal would then be expanded/reproduced by the antenna diversity circuit corresponding to that signal type across the two or more pins of exterior connector assemblies 510 and 520 so that the copies of the same signal would be transmitted by respective two or more antenna modules (e.g., so that a recipient can potentially choose among the strongest of the copies of the signal).

While antenna pass through module 500 features two exterior connector assemblies, in other examples, an antenna pass through module may include as few as one exterior connector assembly. When the antenna pass through module includes only a single exterior connector assembly, the outgoing signal from each interior connector on the antenna interface panel would be mapped by a corresponding antenna diversity circuit to more than one pin on the sole exterior connector assembly and where each pin is connected to a different instance of an antenna module. Similarly, when there is only a single exterior connector assembly, multiple incoming signals of the same signal type that would be received at different pins from different instances of an antenna module would be passed to a corresponding antenna diversity circuit, which would then select the strongest among the signals and send the selected signal to an interior connector on the antenna interface panel.

While antenna pass through module 500 features two exterior connector assemblies, in other examples, an antenna pass through module may include more than two exterior connector assemblies. When the antenna pass through module includes more than two exterior connector assemblies, the outgoing signal from each interior connector on the antenna interface panel is expanded/produced by a corresponding antenna diversity circuit to a corresponding pin in each of the exterior connector assemblies. Similarly, when there are more than two exterior connector assemblies, incoming signals of the same type from different instances of an antenna module that would be received at pins across the different exterior connector assemblies would be passed to a corresponding antenna diversity circuit, which would then select the strongest among the signals and send the selected signal to an interior connector on the antenna interface panel.

Figure 6:
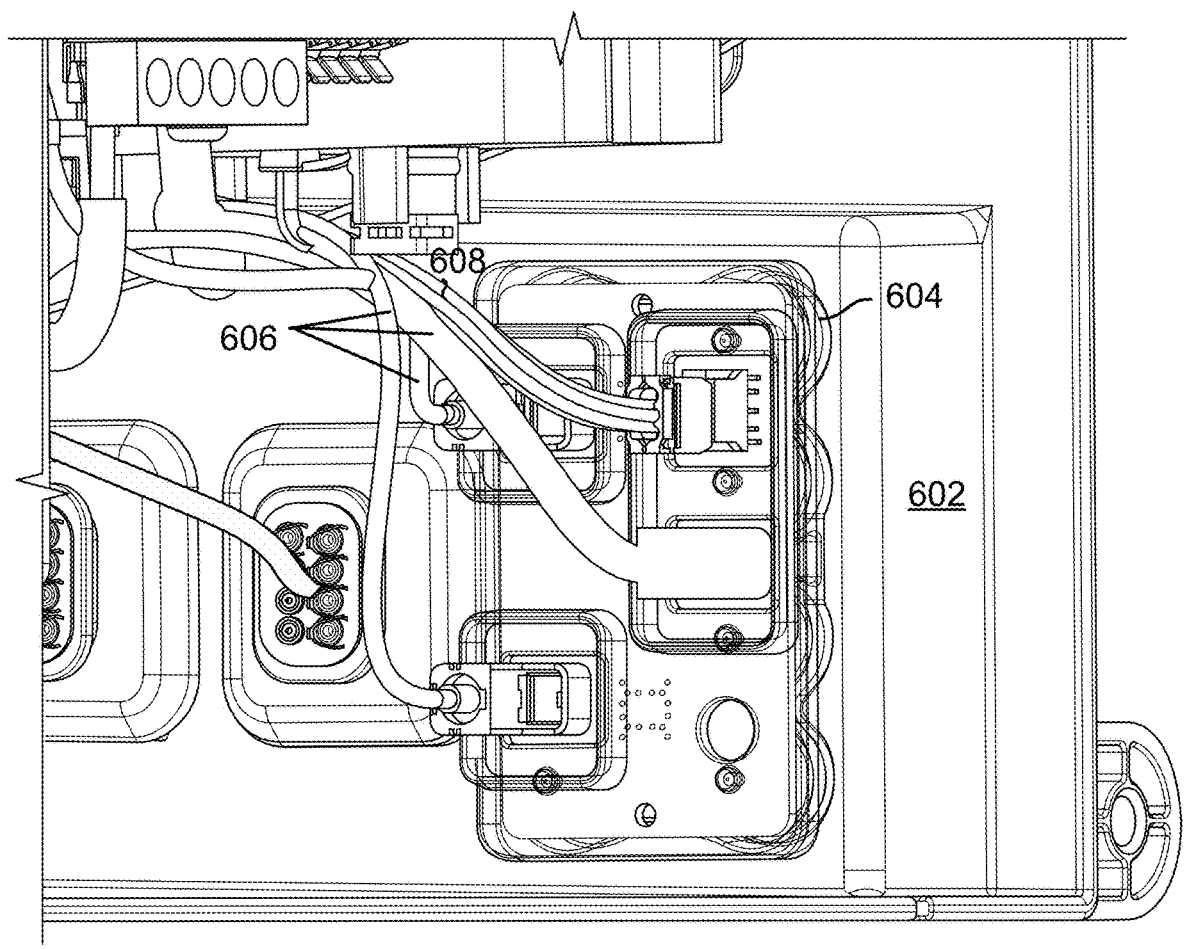
FIG. 6 is a diagram showing an example of an antenna interface panel of an antenna pass through module that has been installed in an inverter device in accordance with some embodiments.

FIG. 6 is a diagram showing an example of an antenna interface panel of an antenna pass through module that has been installed in an inverter device in accordance with some embodiments. In the example of FIG. 6, the one or more exterior connector assemblies of antenna pass through module 604 have been, from the interior of the inverter device, inserted through corresponding ports/openings of side 602 of the inverter device and also fastened against side 602. A respective one of coaxial cables 606 has been plugged into each of the three interior connectors of the antenna panel interface of antenna pass through module 604. As mentioned above, each interior connector can be keyed to be compatible with the pin of one of coaxial cables 606. One end of each coaxial cable of coaxial cables 606 is plugged into an interior connector of antenna pass through module 604 and the other end of that coaxial cable is plugged into a corresponding transceiver that is located on a home controller in the interior of the inverter device. Cable 608 is plugged into the power connector of antenna pass through module 604 and supplies power to the antenna diversity circuits that are encapsulated within the overmolded cover of antenna pass through module 604.

As described above, the antenna interface panel of an antenna pass through module (e.g., antenna pass through module 604) that is located on the inside/interior of an inverter device may include fewer interior connectors than the number of antenna pins that are located on the exterior portion of the antenna pass through module and this is because each antenna diversity circuit can select a subset (e.g., fewer than all) of such incoming antenna signals that are received via the exterior connector assemblies, or expand a single outgoing antenna signal to multiple antenna pins. By positioning the antenna diversity circuit(s) in the interior antenna interface panel, more antenna signals can be received at the exterior connector assemblies while the antenna diversity circuits can enable the selection of only a subset of such antenna incoming signals to pass onto the transceivers located in the interior (e.g., the home controller) of the inverter device and therefore, reduce the number of coaxial cables that are needed to be connected internally within the inverter device. Fewer coaxial cables that are needed within the inverter device will free up space within the device that could be used to install other components. As shown in the example of FIG. 6, even three coaxial cables (coaxial cables 606) already take up considerable space on the interior of the inverter device. If there were a corresponding interior coaxial cable for each instance of a signal that is received at an exterior antenna pin rather a corresponding interior coaxial cable for each signal that is selected among many that are received at exterior antenna pins, then the number of interior coaxial cables would grow significantly and complicate the installation/handling of other components within the inverter device.

Figure 7:
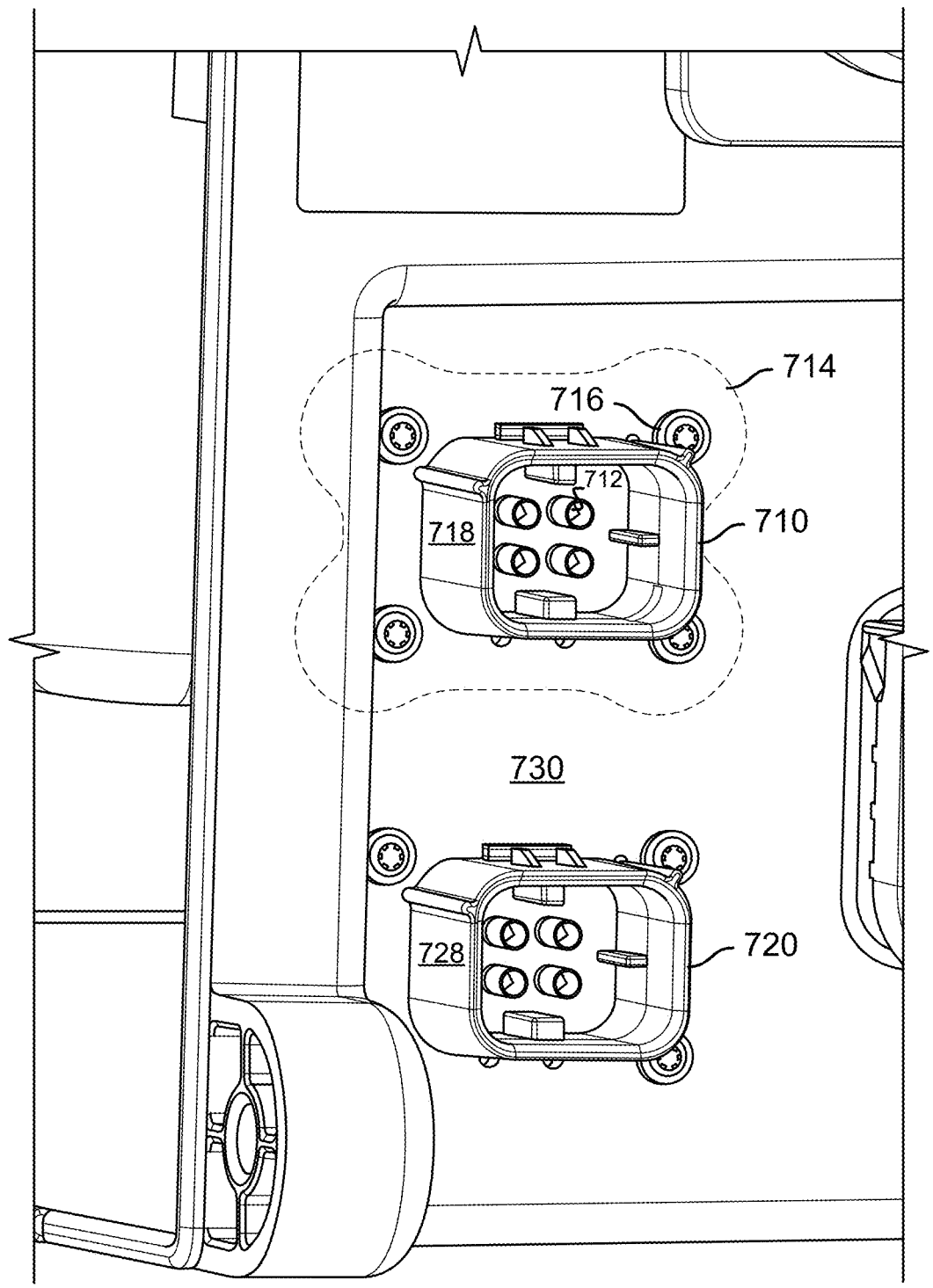
FIG. 7 is a diagram showing the exterior connector assemblies of an antenna pass through module on the exterior of an inverter device in accordance with some embodiments.

FIG. 7 is a diagram showing the exterior connector assemblies of an antenna pass through module on the exterior of an inverter device in accordance with some embodiments. In the example of FIG. 7, housings 718 and 728 of exterior connector assemblies 710 and 720, respectively, of an antenna pass through module have been inserted through two respectively shaped ports/openings on side 730 of an inverter device from the interior of the inverter device. The antenna interface panel of this antenna pass through module remains inside the inverter device and is not visible in FIG. 7. Because each of exterior connector assemblies 710 and 720 has the same subcomponents and is installed similarly into an inverter device, only exterior connector assembly 710 will be described in detail. As shown in FIG. 7, exterior connector assembly 710 includes four antenna pins (e.g., pin 712) that go through the base and are connected to the circuit board on the interior of the inverter device. The four pins of exterior connector assembly 710 are surrounded by a raised housing, housing 718. While the base of exterior connector assembly 710 is located on the interior side of side 730, the dashed outline 714 of the base of exterior connector assembly 710 is shown in FIG. 7 to illustrate the location of the base relative to the exposed housing/pins of an exterior connector assembly. While not shown in FIG. 7, as mentioned above, in some embodiments, the base of an exterior connector assembly includes a gasket that encircles the locations of the antenna pins and where the gasket is pressed against the interior of side 730 to keep a tight, waterproof seal between the antenna pass through module and the bulkhead/side 730. The base of exterior connector assembly 710 includes four through-holes (e.g., including hole 716). Side 730 includes openings/holes that match up to the four through-holes of the base of the exterior connector assembly. The antenna pass through module can be fastened against side 730 via fasteners (e.g., screws) that connect side 730 to external connector assemblies via through-holes such as through-hole 716.

Multiple coaxial cables (not shown) can be plugged into up to all four antenna pins of exterior connector assembly 710 to connect the pins to a corresponding antenna module (not shown) that includes multiple types of antennas. For example, the pins of exterior connector assembly 710 can be plugged into a first instance of an antenna module that is located at a first location on the exterior of the inverter device and the pins of exterior connector assembly 720 can be plugged into a second instance of an antenna module that is located at a second location on the exterior of the inverter device. This way, two incoming signals of the same type from the two antenna modules can be received at pins of both exterior connector assemblies and then the stronger of the two can be selected by a corresponding antenna diversity circuit of the antenna interface panel located on the interior of the inverter device. The selected, stronger signal can then be routed from an interior connector of the antenna interface panel to a transceiver located on the interior of the inverter device. Similarly, an outgoing signal from a transceiver can be expanded by a corresponding antenna diversity circuit of the antenna interface panel to a respective pin in each of exterior connector assembly 710 and exterior connector assembly 720 such that copies of the outgoing signal are transmitted by both antenna modules.

In some embodiments, the portion of side 730 through which housings 718 and 728 of exterior connector assemblies 710 and 720 are inserted is concave into the interior of the inverter device. Due to being inserted through the concave portion of side 730, the protruding housings 718 and 728 of exterior connector assemblies 710 and 720 can be covered by a cover that extends from the non-concave portion of side 730.

Figure 8:
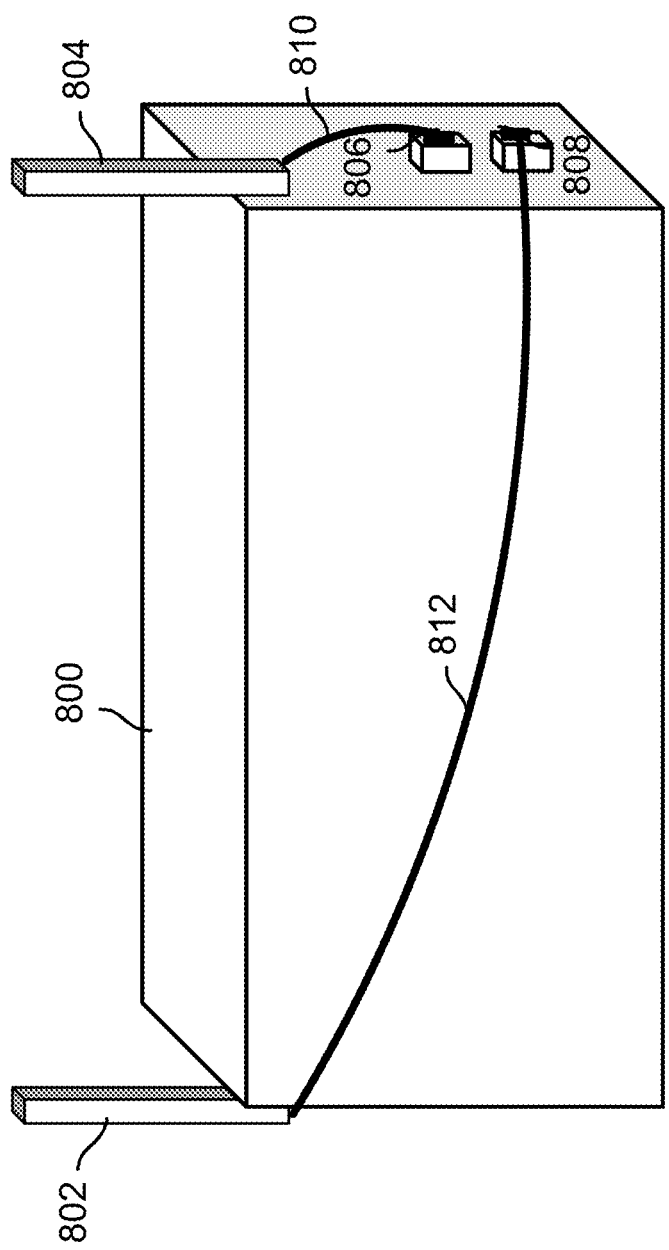
FIG. 8 is a diagram showing an example of multiple antenna modules that are placed at different locations on the exterior of an inverter device in accordance with some embodiments.

FIG. 8 is a diagram showing an example of multiple antenna modules that are placed at different locations on the exterior of an inverter device in accordance with some embodiments. In the example of FIG. 8, inverter device 800 is shown to be enclosed. Two antenna modules 802 and 804 are mounted at opposite ends of the exterior of the enclosure of inverter device 800. Antenna module 804 is connected to the antenna pins of exterior connector assembly 806 via coaxial cable 810 and antenna module 802 is connected to the antenna pins of exterior connector assembly 808 via coaxial cable 812. Both exterior connector assemblies 806 and 808 are the portion of an antenna pass through module exterior to the enclosure of inverter device 800. The portion of the antenna pass through module, the antenna interface panel, that is located on the interior of inverter device 800 is not visible in FIG. 8.

Antenna modules 802 and 804 include antennas that send and receive at least some of the same types of signals (e.g., LTE, WiFi, Bluetooth, and/or 900 Mhz). However, due to the different physical placement of each of antenna modules 802 and 804 relative to inverter device 800, the incoming signals of the same type may be received at antenna modules 802 and 804 with differing amounts of noise and therefore, at different strengths. As such, by having multiple antenna modules placed in different physical locations relative to inverter device 800, the probability that one of the incoming signals can be received with a desired strength improves. The selection of the strongest incoming signal among those that are received across both antenna modules 802 and 804 is performed by first having the signals being received at the antenna pins of exterior connector assemblies 806 and 808. Then, the antenna pins of exterior connector assemblies 806 and 808 pass the received signals to an antenna diversity circuit corresponding to that signal type and the circuit selects the stronger of the two signals to route to a transceiver corresponding to that signal type on the interior of inverter device 800. For example, the transceiver is located on a home controller on the interior of inverter device 800 and can decode the selected signal into a (e.g., user initiated) request to be handled.

While the example of FIG. 8 shows an inverter device with two antenna modules, in some other examples, more or fewer antenna modules can be mounted on the inverter device.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An inverter device, comprising:
   an enclosure comprising a plurality of sides;
   an antenna port in a first side of the plurality of sides; and
   an antenna pass through module comprising:
     an exterior connector assembly comprising a plurality of pins and a base, wherein the plurality of pins are operable to be connected to respective ones of a plurality of antennas, wherein the plurality of pins passes through the antenna port to an exterior of the enclosure, wherein the base of the exterior connector assembly is sealed against the first side on an interior of the enclosure to provide ingress protection; and
     an interior antenna circuit configured to:
       terminate connections from a plurality of transceivers within the interior of the enclosure; and
       select antenna signals from at least the plurality of pins on the exterior is connector assembly to route the plurality of transceivers.

2. The inverter device of claim 1, wherein the antenna pass through module further comprises a plurality of interior connectors on the interior of the enclosure.

3. The inverter device of claim 2, wherein the plurality of transceivers terminate at the plurality of interior connectors.

4. The inverter device of claim 3, wherein the plurality of transceivers are connected to the plurality of interior connectors via a plurality of coaxial cables that are keyed to respective ones of the plurality of interior connectors.

5. The inverter device of claim 2, wherein the plurality of interior connectors are automotive connectors.

6. The inverter device of claim 2, wherein the interior antenna circuit further comprises an insulating overmolded cover that covers the interior antenna circuit and includes cutout regions to expose the plurality of interior connectors to the interior of the enclosure.

7. The inverter device of claim 1, wherein to select the antenna signals from the at least the plurality of pins on the exterior connector assembly comprises to select an antenna signal among a set of two or more antenna signals associated with a same antenna signal type.

8. The inverter device of claim 1, wherein the inverter device further comprises:
a plurality of antenna modules on the exterior of the enclosure; and
wherein to select antenna signals from the at least the plurality of pins on the exterior connector assembly comprises to select an antenna signal among a set of two or more antenna signals associated with a same antenna signal type and received from different antenna modules from the plurality of antenna modules.

9. The inverter device of claim 8, wherein a first antenna module of the plurality of antenna modules is located at a first location on the exterior of the enclosure, wherein a second antenna module of the plurality of antenna modules is located at a second location on the exterior of the enclosure, and wherein the first location is different from the second location.

10. The inverter device of claim 9, wherein the exterior connector assembly comprises a first is exterior connector assembly, wherein the plurality of pins comprises a first plurality of pins, and wherein the inverter device further comprises a second exterior connector assembly comprising a second plurality of pins, wherein the first plurality of pins are connected to the first antenna module and the second plurality of pins are connected to the second antenna module.

11. The inverter device of claim 1, wherein the antenna pass through module further comprises a power connector that is operable to connect to a power source for the interior antenna circuit.

12. The inverter device of claim 1, wherein the base of the exterior connector assembly comprises a gasket, and wherein the gasket seals against the first side on the interior of the enclosure.

13. The inverter device of claim 1, wherein the base comprises a first set of through-holes, wherein the first side on the interior of the enclosure comprise a second set of through-holes that match the first set of through-holes, and wherein the base is fastened against the first side on the interior of the enclosure via fasteners that are inserted into the first set of through-holes and the second set of through-holes.

14. The inverter device of claim 1, wherein the plurality of pins are surrounded by a corresponding housing, and wherein the housing also passes through the antenna port.

15. The inverter device of claim 1, wherein the ingress protection provides water resistance.

\* \* \* \* \*